United States Patent Office 3,198,711
Patented Aug. 3, 1965

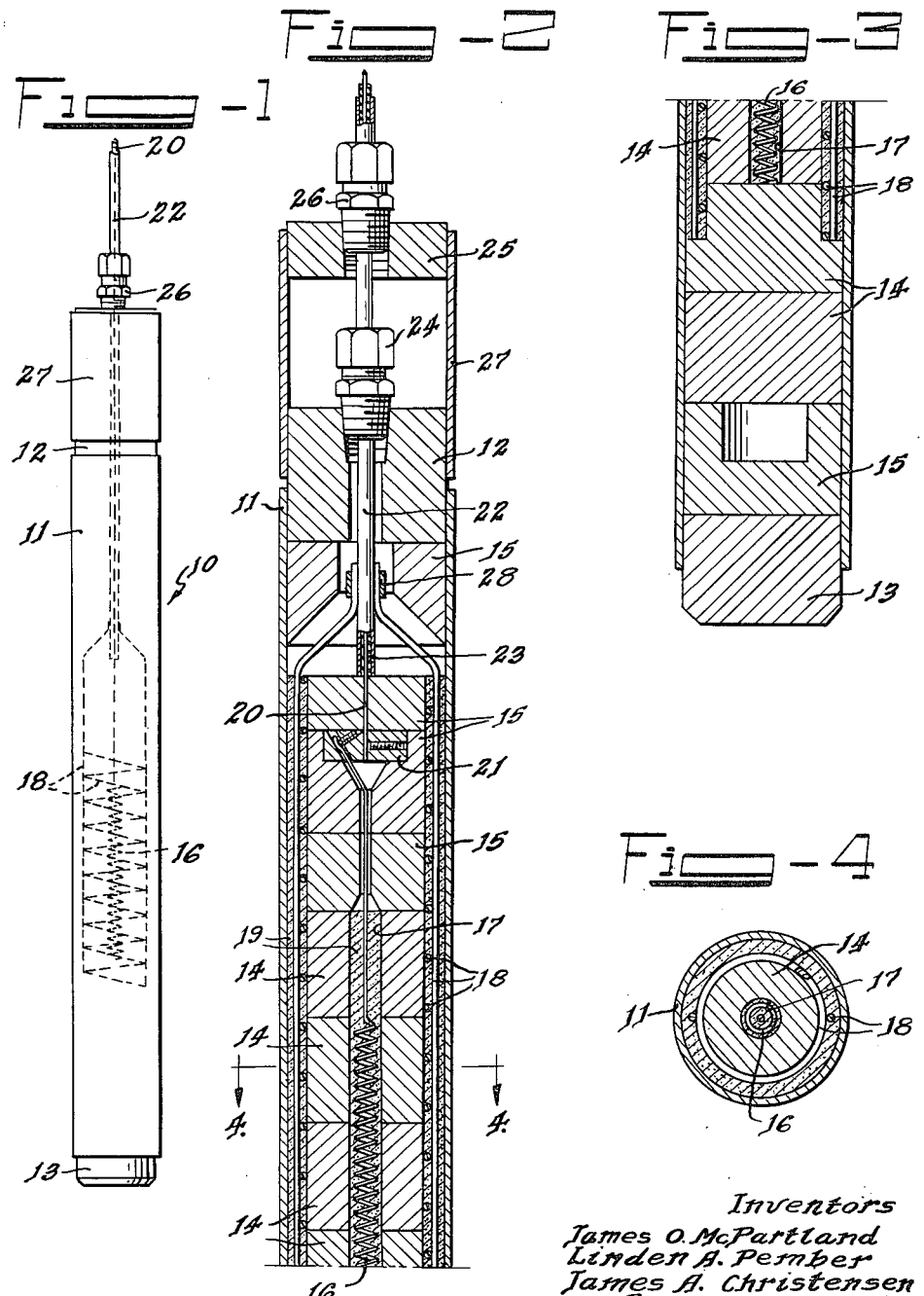

3,198,711
THERMOELECTRIC NUCLEAR FUEL ELEMENT
James O. McPartland, Kennewick, and Linden A. Pember, Pasco, Wash., and James A. Christensen, Pittsburgh, Pa., assignors to the United States of America as represented by the United States Atomic Energy Commission
Filed Aug. 18, 1964, Ser. No. 390,493
2 Claims. (Cl. 176—68)

This invention relates to a fuel element for a nuclear reactor which is capable of converting fission heat directly to electrical energy. In more detail, the invention relates to a fuel element incorporating ceramic fuel from which thermoelectric power can be extracted at reactor operating temperatures.

It is well known that an electromotive force is produced when two dissimilar materials are joined to form an electrical circuit and one junction is heated. A nuclear reactor which develops thermoelectric power by utilizing the above-described phenomenon is described in U.S. Patent No. 2,902,423, dated September 1, 1959. According to this patent metallic fuel is sandwiched between Constantan and Chromel thermoelectric elements to form the hot junctions of a thermopile. An electromotive force is generated in circuits including these thermocouples when the reactor is in operation. U.S. application S.N. 194,206, filed May 11, 1962, now Patent No. 3,167,482, issued January 26, 1965, describes a ceramic fuel element which develops thermoelectric power from uranium oxides having slightly different oxygen content.

It is an object of the present invention to develop a novel fuel element for a nuclear reactor which directly converts fission heat to electrical energy.

It is a more detailed object of the present invention to develop a fuel element for a nuclear reactor incorporating a couple which employs a ceramic fuel as one element of the couple and a metal in contact therewith as the other element of the couple.

These and other objects of the present invention are attained in a fuel element composed of a plurality of axially aligned hollow uranium dioxide cylinders, a coil of tungsten wire embedded in vibrationally compacted uranium dioxide powder inside the uranium dioxide cylinders, a metal jacket enclosing the uranium dioxide cylinders, and a screen-grid of tungsten embedded in vibrationally compacted uranium dioxide powder surrounding said uranium dioxide cylinders.

Although the invention is described specifically with respect to uranium dioxide as the fuel and tungsten as the metal, it will be appreciated that other ceramic fuels such as plutonium dioxide and other metals which are compatible with the other materials, maintain their characteristics and do not adversely affect the thermoelectric properties of the fuel material for extended periods at fuel core temperatures, such as rhenium, tantalum, moylbdenum, vanadium and niobium, can be used. These materials are suitable to at least 1600° C. and perhaps 1800° C., while tungsten appears to be compatible to the melting point of both uranium dioxide and plutonium dioxide.

The invention will next be described in connection with the accompanying drawing wherein:

FIG. 1 is an elevational view of a fuel element according to the present invention, FIG. 2 is a vertical sectional view through the top portion thereof, FIG. 3 is a vertical sectional view through the bottom portion thereof, and FIG. 4 is a horizontal sectional view taken on the line 4—4 in FIG. 2.

Referring now to the drawing, a fuel element 10 comprises a stainless steel jacket 11 provided with end caps 12 and 13 at the top and bottom thereof, respectively. Jacket 11 encloses a plurality of axially aligned, sintered uranium dioxide, hollow cylinders 14 having alumina spacers 15 disposed at the ends thereof. A coiled tugnsten wire 16 is disposed in opening 17 at the center of cylinders 14 and a tungsten wire screen grid 18 is wrapped around cylinders 14. Both coiled tungsten wire 16 and grid 18 are embedded in vibrationally compacted uranium dioxide powder 19. Tungsten coil 16 is connected to a nickel wire 20 by means of nickel connection block 21. Nickel wire 20 is disposed in a stainless steel sheath 22 which is insulated from nickel wire 20 by magnesium oxide insulation 23. Sheath 22 passes through end cap 12 and a sealing connector 24 disposed therein and a supplemental end cap 25 provided with a sealing connector 26, the supplemental end cap 25 being connected to end cap 12 by a stainless steel sheath 27. Supplemental end cap 25 and connector 26 are provided to ensure that no fission gases are released from fuel element 10. Wire 20 leads ultimately to the load while grid 18 is connected to sheath 22 by a crimp connector 28 and ultimately to ground through connector 24 and end cap 12.

According to one specific embodiment of the invention uranium dioxide cylinders 14 are 1.25 inches in diameter and axial opening 17 is 0.25 inch in diameter. Cylinders 14 are sintered to a density of 95% of theoretical while uranium dioxide powder 19 is vibrationally packed to a density of 70% of theoretical. The fuel extends for a length of 6.8 inches. The tungsten wire coil is made from 0.002-inch diameter wire while the tungsten wire grid is formed from 0.020-inch diameter wire spaced 0.5 inch apart.

The above-described test fuel element was placed in the Materials Test Reactor at the National Reactor Test Station at Idaho Falls, Idaho, for 14 days. An average thermal E.M.F. of 500 $\mu v./°$ C. was measured at a core temperature of 1000° C.

This thermal E.M.F. results from the completion of an electric circuit including two dissimilar materials—uranium dioxide and tungsten—which are in contact at a hot junction at the center of the element and at a cold junction at the outside of the element. A nuclear reactor incorporating a very large number of such elements can produce useful thermoelectric power in addition to nuclear power.

For direct energy conversion to be practical in an element of this type, it is necessary to draw large amounts of direct current through the high temperature oxide. In many of the oxide ceramics exhibiting ionic bonding there exists some degree of ionic conduction. If this conduction were not suppressed the material might decompose and perhaps react with the electrode or cladding. It has been shown that slight additions of other oxide materials with similar structure (e.g., yttria and thoria) will both raise the electrical conductivity and decrease vaporization. If the magnitude of vaporization is indicative of the looseness of bond or mobility of the constituent atoms in the oxide, then additions of thoria or yttria should also reduce the ionic conduction if added in proper amounts. Additions of thoria could be desirable for suppressing vaporization (decomposition), increasing electrical conductivity, and providing a fissionable uranium isotope after neutron capture and decay. While additions of these materials are desirable, as indicated above, they are not essential to the operability of the invention.

It will be understood that the invention is not to be limited to the details given herein but that it may be modified within the scope of the appended claims.

The embodiments of the invention in which an exclusive property or privilege is claimed are defined as follows:

1. A fuel element for a nuclear reactor comprising an elongated hollow cylindrical body of a sintered ceramic fuel material, a jacket surrounding said cylindrical body, compacted ceramic fuel powder in the opening at the center of said cylindrical body, a coil of metal wire embedded in said compacted fuel powder, an electrical connection from said coil to the exterior of the fuel element, compacted ceramic fuel powder surrounding said cylindrical body, a metal wire grid embedded in said compacted powder and an electrical connection between said wire grid and ground.

2. A fuel element for a nuclear reactor according to claim 1 wherein each of said metals is tungsten and each of said fuels is $UO_2$.

References Cited by the Examiner

UNITED STATES PATENTS

| | | | |
|---|---|---|---|
| 3,005,766 | 10/61 | Bartnoff | 176—68 |
| 3,008,890 | 11/61 | Bartnoff | 176—68 |
| 3,117,913 | 1/64 | Shoupp | 176—68 |

CARL D. QUARFORTH, *Primary Examiner.*

L. DEWAYNE RUTLEDGE, *Examiner.*